May 26, 1925.  1,539,226
A. C. WHITE ET AL
COLLAPSIBLE COT
Filed April 16, 1923    2 Sheets-Sheet 2
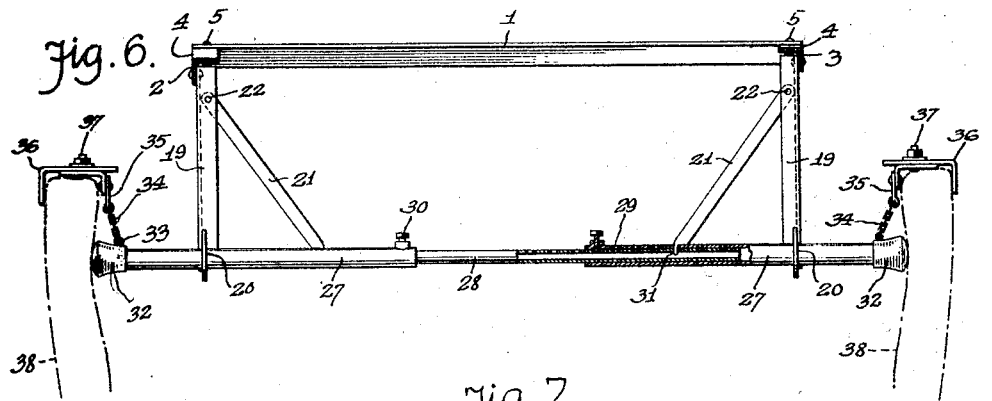
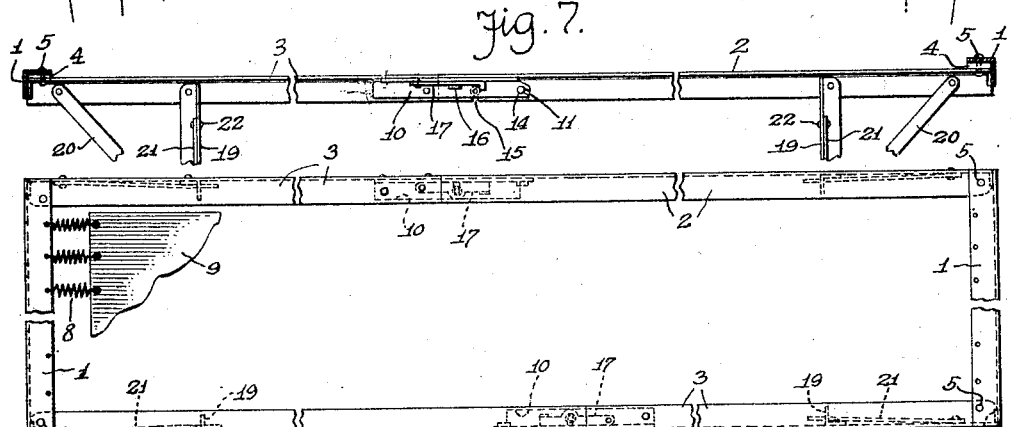
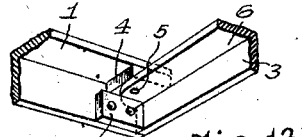
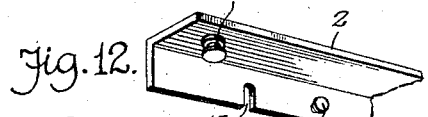
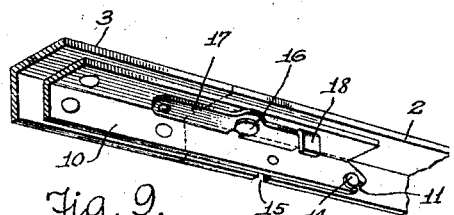
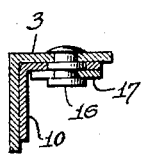
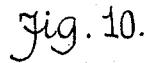
Inventor
Albert C. White,
Lee H. Fronwiller,
By
Attorneys Patented May 26, 1925.

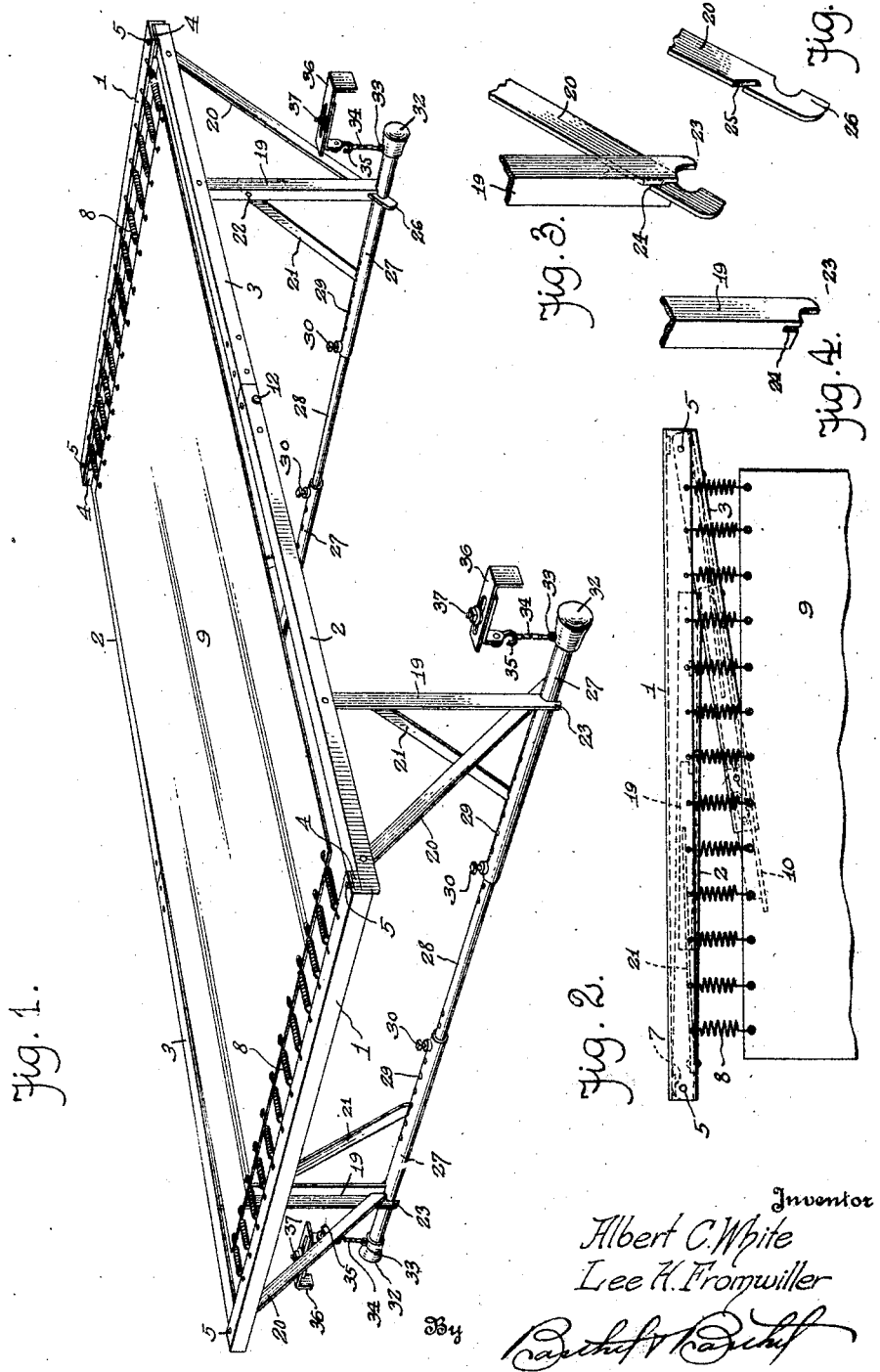

1,539,226

UNITED STATES PATENT OFFICE.

ALBERT C. WHITE AND LEE H. FROMWILLER, OF DETROIT, MICHIGAN.

COLLAPSIBLE COT.

Application filed April 16, 1923. Serial No. 632,543.

*To all whom it may concern:*

Be it known that we, ALBERT C. WHITE and LEE H. FROMWILLER, citizens of the United States of America, residing at Detroit, in the county of Wayne and State of Michigan, have invented certain new and useful Improvements in Collapsible Cots, of which the following is a specification, reference being had therein to the accompanying drawings.

This invention relates to a collapsible cot and has special reference to that class of cots or bed structures which may be folded or collapsed to occupy a comparatively small space when not in use.

One of the objects of our invention is to provide a collapsible cot embodying a foldable frame, a spring supported mattress or sheet, legs, supports and brackets. The cot, without the supports and brackets may be used in a house like any ordinary cot, used for camping purposes, and by virtue of the supports and brackets used in an automobile body. It is the last mentioned use for which we have especially designed our collapsible cot and with such end in view it has been made so that it may be folded into a comparatively small parcel and readily carried in an automobile or on the running board thereof for use when the occupants of the automobile desire to spend a night in the same. The brackets permit of the supports being suspended from the side walls of the automobile body and the cot may be set up on said supports to afford a maximum yieldable sleeping surface within the automobile body. Since the cot may be used without the supports or brackets a tourist may set up the cot outside of the automobile and it is in this connection that a suitable tent or shelter may be associated with the cot.

Another object of our invention is to provide a collapsible cot embodying a frame having foldable sections with a mattress or sheet attached to certain of the sections to at all times be in place when the frame is unfolded and set up, and a portion of the frame may serve as a core about which the mattress or sheet may be wrapped and thus form a very compact structure when knocked down for either storage or carrying purposes.

A still further object of our invention is to provide a strong, durable and inexpensive collapsible cot that can be easily and quickly set up or knocked down without any danger of the parts of the cot or the manipulator thereof being injured.

The above are a few of the objects attained by our collapsible cot and others will appear as the nature of the invention is better understood from the following description taken in connection with the drawings.

Figure 1 is a perspective view of the cot in a set up position;

Fig. 2 is a plan of a portion of the cot showing side rails of the cot frame partly folded;

Fig. 3 is a perspective view of a portion of one of the foldable legs of the cot;

Figs. 4 and 5 are similar views of parts composing a foldable leg;

Fig. 6 is a cross sectional view of the collapsible cot showing the manner in which it may be supported or suspended relative to the side walls of an automobile body;

Fig. 7 is a longitudinal sectional view of a portion of the cot, partly broken away, showing one of the sectional side rails;

Fig. 8 is a plan of the cot partly broken away;

Fig. 9 is a perspective view of a portion of one of the sectional side rails of the cot showing a fastener for maintaining a rigid connection;

Fig. 10 is a cross sectional view of the sectional side rail shown in Fig. 9;

Figs. 11 and 12 are perspective views illustrating separated sections of the side rail, and Fig. 13 is a perspective view of a portion of the cot showing articulated side and end rails.

To put our invention into practice, we provide a rectangular metallic frame having separable end portions with each side portion adapted to be collapsed so that the end portions may be placed in proximity to each other. With this end in view angle bars are employed to form end rails 1 and side rails, the side rails being composed of sections 2 and 3 which may be swung inwardly into substantial parallelism with the end rails or said sections placed in alinement and connected to cooperate with the end rails in forming a rectangular metallic frame.

The lateral flanges of the end rails 1 have the ends thereof provided with spacing or bearing blocks 4 and pivotally connected to these blocks by pins 5 or other pivotal means are the lateral flanges 6 of the side rail sections 2 and 3. It is through the medium of such pivotal connections that the sections 2 and 3 of the side rails may be swung inwardly, as shown in Fig. 2 and to relieve the pivotal connections of any weight on the sectional side rails, supporting blocks 7 are mounted on the inner walls of the vertical flanges of the end rails 1, as shown in Fig. 13, so that the ends of the lateral flanges 6 of the side rails will extend between the blocks 4 and 7 and be supported by the latter instead of solely by the pivotal connections 5.

The lateral flanges of the end rails 1 are provided with a multiplicity of retractile coiled springs 8 which are suitably connected to the ends of a mattress, sheet or web 9 that may be made of strong and durable canvas, duck or any suitable flexible material.

The side rail sections 2 are preferably of greater length than the side rail sections 3 and the long sections are adapted to be swung inwardly in advance of the short sections 3, as shown in Fig. 2, and by making the spacing blocks 4 of greater thickness at one end of each end rail 1 than at the opposite end the long side rail sections 2 will provide clearance for the lateral flanges of the short rail sections 3.

The free ends of the short rail sections 3 are provided with projecting angle cleats 10 adapted to extend into the ends of the long sections 2, said cleats having the protruding ends thereof provided with notches 11, side pins 12 and top openings 13. The notches 11 of the cleats 10 permit of the ends of said cleats being mounted on inwardly projecting pins 14 of the long side rail sections 2 and the pins 12 of said cleats are adapted to engage in notches or slots 15 provided therefor in the long side rail sections 2. These long side rail sections 2 have depending pins 16 adapted to extend through the top openings 13 of said cleats. All of the pins 12, 14 and 16 have heads, particularly the latter, so that pivoted slotted latches 17, carried by the cleats 10, may be swung into engagement with the pins 16 to prevent vertical displacement of the long sections 2 relative to the short sections 3 of the cleats 10 thereof, thus alining the ends of the long sections with the ends of the short sections on the cleats 10. The latches 17 have finger pieces 18 so as to be conveniently manipulated and by reference to Figs. 9 to 12 inclusive it will be noted that a rigid connection is established between the long and short sections of the side rails.

The pivoted ends of the rail sections 2 and 3 are provided with foldable legs, each composed of a vertical member 19, an angularly disposed member 20, and a brace 21. The members 19 and 20 are pivotally connected to the side flanges of the rail sections 2 and 3 and the vertical members 19 of said legs are preferably made of angle bars so that the braces 21 may be pivotally connected to one of the flanges of each angle bar, as at 22.

The lower end of each vertical member is cut away to provide a jaw 23 and a slot 24, the slot 24 receiving the lower slotted portion 25 of the angularly disposed member 20 which is also cut away to provide a jaw 26. The jaws 23 and 26 are adapted to cooperate in gripping a telescopic adjustable support comprising end tubular members 27 and a connecting tubular member 28 on the ends of which the end members 27 are adjustable. The tubular members 27 and 28 have openings 29 adapted to register and the inner ends of the tubular members 27 are provided with set screws 30 adapted to engage in openings of the member 28 and hold the members 27 in adjusted positions relative to the connecting members. The registering openings 29 of the members 27 and 28 are adapted to receive depending pins 31 of the braces 21, as best shown in Figs. 1 and 6 and these depending pins will cooperate with the jaws 23 and 26 of the legs in anchoring the cot relative to the telescopic adjustable supports.

On the outer ends of the tubular members 27 are cushion members 32, preferably in the form of rubber or yieldable caps which may be retained on the ends of each support by screw eyes 33 to which are connected suspension members 34, preferably in the form of chains. The suspension members 34 are connected to hooks 35 attached to adjustable brackets or hangers 36, each composed of two angle bars connected by nut equipped bolts 37.

The telescopic adjustable supports may be increased or decreased in their longitudinal dimension and fitted between the side walls 38 of an automobile body with the cushion members 32 of the supports preventing injury to the side walls 38 or upholstery thereof. The brackets or hangers 36 may be adjusted to fit over walls of various widths and when the collapsible cot is to be used in an automobile the suspension members 34 are made of proper length to correctly support the collapsible cot and provide maximum space between the mattress 9 and the top of the automobile.

When the cot is collapsed the end members 27 of the supports may be shifted inwardly on the connecting members 28 to reduce the length of said supports to approximately that of the end rails 1. The members 19 and 20 of each leg may be folded against the side rail sections with the braces 21 folded against the vertical members 19. The latches 17 of the side rails may be opened, the sections separated and swung inwardly towards the end rails 1. The supports can then be placed at one of the end rails and using the end rails and supports as a core the mattress may be rolled up to form a cylindrical parcel that may be conveniently carried in or about an automobile.

It is thought that the utility of our collapsible cot will be apparent without further description, and while in the drawings, there are illustrated the preferred embodiments of our invention, it is to be understood that the structural elements are susceptible to such changes, in size, shape and manner of assembling, as fall within the scope of the appended claims.

What we claim is:—

1. In a collapsible cot for automobiles, transverse supports adapted to be fitted between walls of an automobile body, hangers for supporting said supports relative to the walls of the automobile body, a frame, foldable legs carried by said frame, said foldable legs being arranged so that ends thereof may be placed in scissor-like relation for gripping said transverse supports, and a web in said frame.

2. A collapsible cot comprising end rails, a web resiliently supported by said end rails, sectional side rails carried by said end rails adapted to be folded in parallelism with said end rails and one of said end rails used as a core about which said web can be wound to place the other end rail in proximity to said end rail, legs carried by said sectional side rails, braces carried by some of said legs, and transverse supports adapted to be gripped by said legs and engaged by said braces, said legs having ends thereof placed in scissor-like relation for gripping said supports.

In testimony whereof we affix our signatures in presence of two witnesses.

ALBERT C. WHITE.
LEE H. FROMWILLER.

Witnesses:
KARL H. BUTLER,
ANNA M. DORR.